(12) United States Patent
Dutch et al.

(10) Patent No.: US 9,195,685 B2
(45) Date of Patent: *Nov. 24, 2015

(54) MULTI-TIER RECOVERY

(71) Applicant: EMC Corporation, Hopkinton, MA (US)

(72) Inventors: Michael John Dutch, Saratoga, CA (US); Christopher Hercules Claudatos, San Jose, CA (US); Mandavilli Navneeth Rao, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,826

(22) Filed: Sep. 6, 2013

(65) Prior Publication Data

US 2014/0074789 A1 Mar. 13, 2014

Related U.S. Application Data

(63) Continuation of application No. 12/895,840, filed on Sep. 30, 2010, now Pat. No. 8,549,350.

(51) Int. Cl.
*G06F 11/00* (2006.01)
*G06F 17/30* (2006.01)
*G06F 21/44* (2013.01)
*G06F 21/62* (2013.01)
*G06F 11/14* (2006.01)

(52) U.S. Cl.
CPC ...... *G06F 17/30289* (2013.01); *G06F 11/1469* (2013.01); *G06F 21/44* (2013.01); *G06F 21/6218* (2013.01); *G06F 11/1453* (2013.01); *G06F 11/1466* (2013.01)

(58) Field of Classification Search
CPC ............ G06F 11/1402; G06F 11/1412; G06F 11/1433; G06F 11/1435; G06F 11/1458; G06F 11/1469
USPC ..................................... 714/6.1, 15
See application file for complete search history.

(56) References Cited

U.S. PATENT DOCUMENTS

| | | | |
|---|---|---|---|
| 4,974,156 A | 11/1990 | Harding et al. | |
| 5,485,606 A * | 1/1996 | Midgdey et al. | |
| 6,038,379 A * | 3/2000 | Fletcher et al. | 709/230 |
| 6,185,699 B1 | 2/2001 | Haderle et al. | |

(Continued)

FOREIGN PATENT DOCUMENTS

| CN | 101316274 A | 12/2008 |
|---|---|---|
| CN | 101651710 A | 2/2012 |

OTHER PUBLICATIONS

How to Recover Specific Files from a Windows System Image, date unknown, author unknown.*

(Continued)

*Primary Examiner* — Marc Duncan
(74) *Attorney, Agent, or Firm* — Van Pelt, Yi & James LLP

(57) ABSTRACT

A method, article of manufacture, and apparatus for restoring data. In some embodiments, this includes backing up data in a first form with a backup application, updating the backup application, and using the updated backup application to restore the backed up data in a second form. In some embodiments, the first form includes a backup image. In some embodiments, the second form is individual files.

13 Claims, 5 Drawing Sheets

(56) References Cited

U.S. PATENT DOCUMENTS

| | | | |
|---|---|---|---|
| 7,024,581 | B1 | 4/2006 | Wang et al. |
| 7,165,164 | B2 | 1/2007 | Willis et al. |
| 7,873,599 | B2 | 1/2011 | Ishii et al. |
| 7,937,545 | B1 * | 5/2011 | Wu et al. ............. 711/162 |
| 8,099,065 | B2 | 1/2012 | Fujii |
| 8,126,847 | B1 * | 2/2012 | Zheng et al. ............. 707/640 |
| 8,260,748 | B1 * | 9/2012 | Manko et al. ............. 707/645 |
| 8,336,044 | B2 | 12/2012 | Wang et al. |
| 8,504,870 | B2 | 8/2013 | Dutch et al. |
| 8,712,968 | B1 * | 4/2014 | Chester et al. ............. 707/649 |
| 8,738,871 | B1 * | 5/2014 | Naftel et al. ............. 711/162 |
| 2003/0221095 | A1 | 11/2003 | Gaunt et al. |
| 2004/0030954 | A1 | 2/2004 | Loaiza et al. |
| 2005/0102289 | A1 | 5/2005 | Sonoda et al. |
| 2007/0046791 | A1 | 3/2007 | Wang et al. |
| 2007/0100913 | A1 | 5/2007 | Sumner et al. |
| 2007/0128899 | A1 | 6/2007 | Mayer |
| 2007/0214181 | A1 | 9/2007 | Okamoto |
| 2007/0288593 | A1 | 12/2007 | Wang |
| 2007/0294321 | A1 | 12/2007 | Midgley et al. |
| 2008/0154987 | A1 | 6/2008 | Kottomtharayil et al. |
| 2008/0154989 | A1 * | 6/2008 | Arman ............. G06F 11/1464 |
| 2008/0247821 | A1 | 10/2008 | Hinding |
| 2008/0281865 | A1 | 11/2008 | Price et al. |
| 2008/0307175 | A1 * | 12/2008 | Hart et al. ............. 711/162 |
| 2009/0164409 | A1 * | 6/2009 | Mukherjee ............. 707/1 |
| 2009/0313447 | A1 * | 12/2009 | Nguyen et al. ............. 711/162 |
| 2010/0106885 | A1 | 4/2010 | Gao et al. |
| 2010/0312796 | A1 | 12/2010 | Harris |
| 2011/0087874 | A1 | 4/2011 | Timashev et al. |
| 2011/0145636 | A1 * | 6/2011 | Schauser et al. ............. 714/15 |
| 2011/0196842 | A1 * | 8/2011 | Timashev et al. ............. 707/679 |
| 2012/0136832 | A1 | 5/2012 | Sadhwani |

OTHER PUBLICATIONS

How to Restore Files and Folders From Windows 7 System Image Backup, Dinesh, Jun. 2010.*

* cited by examiner

MULTI-TIER RECOVERY

CROSS REFERENCE TO OTHER APPLICATIONS

This application is a continuation of co-pending U.S. patent application Ser. No. 12/895,840, entitled MULTI-TIER RECOVERY filed Sep. 30, 2010 which is incorporated herein by reference for all purposes.

FIELD OF THE INVENTION

The present invention relates generally to data systems, and more particularly, to systems and methods of efficiently protecting and accessing data.

BACKGROUND OF THE INVENTION

Conventional data recovery technologies emphasize backup and storage. These include making a copy of data and storing the copy version at a different location from the original version. This creates an inefficient use of data since two copies of data are retained.

There have been several advancements in backup and storage technology. One such advancement is deduplication. Deduplication removes redundant data blocks so that only one instance of the data block is stored. This can save potentially massive amounts of storage space, as well as bandwidth when transferring data from a backup client to a backup server.

Though such advancements in backup and storage have led to some increased efficiency, much of the efficiency is lost when recovering the data. For example, when recovering from deduplicated data, the data is reconstituted first and then sent to the recovery target. The recovery process requires much more bandwidth resources than the backup process.

There is a need, therefore, for an improved method, article of manufacture, and apparatus for recovering data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
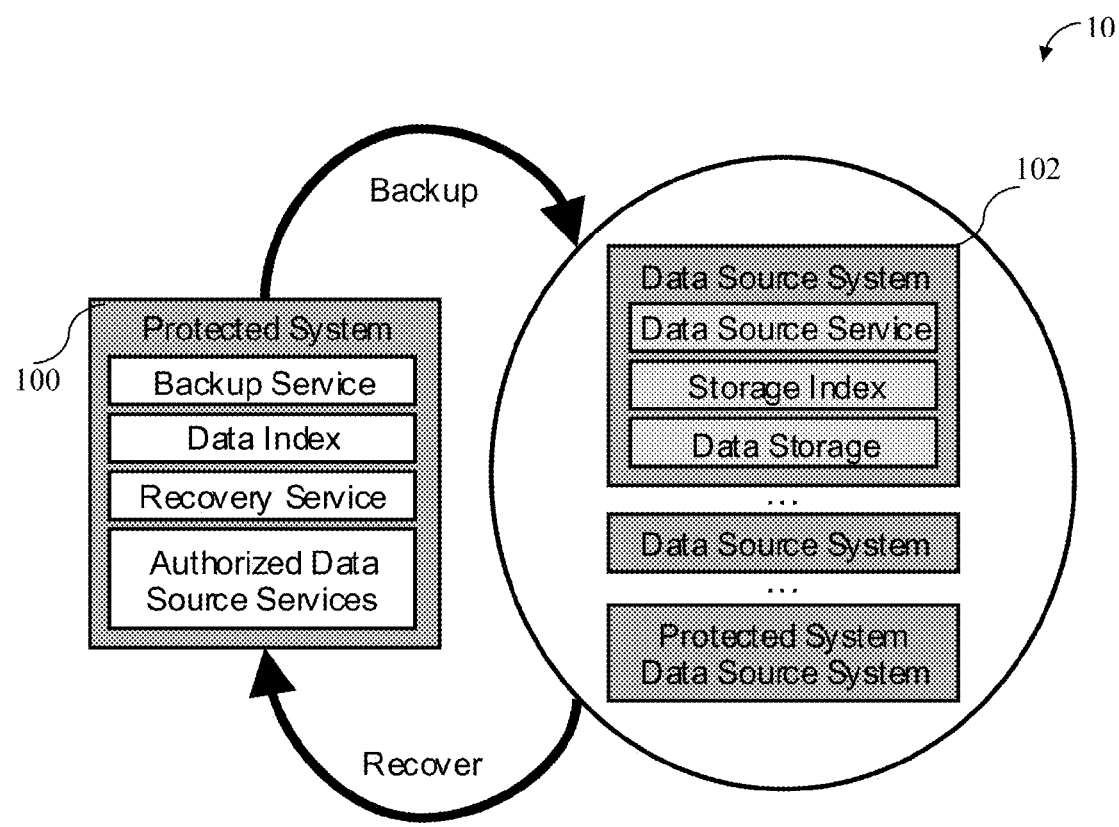
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments of the present invention. Data System 10 includes a Protected System 100, and a Data Source System 102. As illustrated by FIG. 1, there may be multiple Data Source Systems for the Protected System to recover from.

Further, the Protected System may be a Data Source System for itself. Though FIG. 1 illustrates a "Backup" arrow from the Protected System 100 to Data Source System 102, it should be noted that a backup is not required in some embodiments.

In some embodiments, Protected System 100 includes a Backup Service, a Data Index, a Recovery Service, and an Authorized Data Services. A backup service performs back ups for the protected system when requested. These backup requests may be ad hoc, or may be scheduled. For example, a backup service may take an image of a hard drive in the protected system every two weeks. In some embodiments, the backup service may determine which data will be sent to the backup repository (e.g. duplicate files should not be sent again, certain data should not be sent according to policy, etc.), and may provide information necessary to construct a data index (e.g. hashes of objects, names of objects, etc.) The backup service may also provide deduplication and other space saving functions. For example, a backup service may segment each file or data object into data segments, and may create a hash of each file and each data segment. In some embodiments, deduplication may be performed on the target storage device, (e.g. may be a data source system), and accordingly, the information necessary to construct a data index (e.g. hash values) may be provided by the target storage device.

When connecting a protected system to a data source system, the backup service may be responsible for authenticating the identity of each data source system that the backup service communicates with. In some embodiments, the data source system may be responsible for such authentication.

In some embodiments, the data index is created by a backup service, or by another service which manages the data index for one or more protected systems. The data index may include a list of data index entries. Each entry may include information about an object, such as file name, file location, version metadata when backed up (e.g. using a backup application version 1.0), and a hash of the object, among others. In some embodiments the hash of the object may be determined by using a cryptograph hash function. In some embodiments, a data index entry may also include information on a sub level. For example, the data index entry may include information about an object's segment, the segment's segment number (e.g. segment 1 of 10), and a hash of the segment, among others. By having a data index, the protected system will have access to what hashes are necessary to reconstitute files.

It should be noted that although FIG. 1 depicts the backup service, data index, recovery service, and authorized data source services in Protected System 100, such components may reside outside of Protected System 100. For example, a protected system may be a desktop computer, and the data index may reside in a remote location. The data index may, in some embodiments, reside in a data source system. Further, Protected System 100 need not be limited to a single machine. Protected System 100 may, in some embodiments, comprise several different desktops, each desktop with its own data index, or there may be a master data index covering all desktops stored in a remote location. There are many ways to arrange the components without diverging from the spirit of the invention.

In some embodiments, a recovery service maintains a list of authorized data source services that may be used to provide data matching a hash. Data source services may be added to the list through a variety of methods. In some embodiments, a data source service may be added (authorized) by having the backup service use the data source system as a backup target.

In some embodiments, data source services may be added or removed based on configuration settings or dynamic notifications from newly discovered data source services.

A recovery service may be responsible for authenticating the identity of each data source it communicates with. In some embodiments, the data source may be responsible for authenticating the identity of the protected system or recovery service attempting to recover data from the data source. Having the data source authenticate may be preferable to prevent spam recovery requests (e.g. a rogue system randomly sending out hashes to recover data).

Once a data recovery request is received, the recovery service may validate that the request is authorized to recover the specific data. Many users may have access to the same physical computer, but different users may have different access privileges. For example, IT staff may have administrative rights and have access to every file, while guess users may only have access to certain files. In some embodiments, the recovery service would check to see if a user requesting recovery of a file has the rights to access the file in the first place.

In some embodiments, after the recovery request is validated, the names and version metadata may be used to lookup the hash value of the file contents in the data index. In some embodiments, search capability may be utilized to enhance the efficiency recovery process. The search may include a search by name, location, content, system metadata, user metadata, among others. The user may then select one or more files from the search results to begin recovery. Search results need not be limited to files. For example, data segments may be listed and returned if requested.

If a desired file and file version (e.g. win32.dll final version) is not in the data index, it may still be possible to recover the file and file version if a hash value for the desired file's contents can be determined by an alternative hash determination. In some embodiments, an alternative hash determination may include using additional data indices, such as those in "golden" system images. In some embodiments, an alternative hash determination may include requesting a data source return a list of hashes for all objects stored in a container identified by a hash. In this way, common files that reside on multiple systems (such as Windows system files) may be recovered without additional back ups.

During the recovery process, it may be preferable to recover data from local data sources in some embodiments. This may result in significant bandwidth savings. In some embodiments, if a local data source service is available, it requests the location of the file by has value. If a matching location is returned, recovery is completed with little data transfer. If no file hash match is found, the recovery service may request the location of data segments by has value to satisfy a recovery request. For example, suppose File A has segments 1, 2, and 3, File B has segments 2, 3, 4, and File C has segments 1, 2, and 4. If a user requested a recovery of C, but there was no record of File C's hash in a data index, the recovery service could look for the hashes of File C's segments. If File A and File B were in the data index, the recovery process would be able to locate segments 1, 2, 3, and 4, which are sufficient to reconstitute File C (e.g. segments 1, 2, and 4). In this way, even though a record of File C's hash was not in the data index, File C would be recoverable based on File C's segments. Local recovery may be particularly desirable for mobile devices, or other devices with low bandwidth or intermittent connectivity.

In some embodiments, it may be preferable to utilize a remote data source (e.g. requiring a network connection to connect to the data source). Multiple remote data sources may have the requested file. In such cases, the recovery service may prioritize the data sources according to a variety of factors, such as geographical distance, data formats, transfer protocols, bandwidth considerations, performance statistics, policy settings, and resource constraints, among others. For example, if a protected system in Country X discovered that a remote data source in Country Y had a requested file, the differing laws in the two countries may affect the desirability of the protected system to connect to the remote data source in Country.

Several methods may be used to issue recovery requests to remote data sources. For example, one approach includes issuing all recovery requests to the "best" remote data source (e.g. closest, highest resources, etc.). In some embodiments, recovery requests may be distributed across data sources to balance resource utilization. A peer to peer communication protocol such as BitTorrent may be used to transfer data from multiple remote data sources.

The data source service is provided for each storage system or computer system from which data may be used to satisfy a data recovery request. A data source service may be provided for computer systems that may or may not be protected systems (e.g. systems that have not performed a backup, among others). In some embodiments, the data source service may be responsible for authenticating the identity of each backup service and recovery service that it communicates with and ensuring that all such communications are authorized. Data source services that provide data from cloud service providers have to ensure that privacy and other aspects of multi-tenancy (e.g. several users accessing the same "cloud") are satisfied. The data source service may in some embodiments provide transformation services. Transformation services may include allowing data stored in one format to be presented in another format. For example, data stored as a disk image may be presented as one or more files. Similarly, data stored as a set of files may be presented as a disk image. This may be desirable when migrating between different operating environments (e.g. Windows to Linux, physical to virtual systems, etc.).

In some embodiments, transformations may be generated, indexed, and stored prior to receiving requests for transformed data objects. In some embodiments, transformation, indexing, and presentation of the transformed data may be performed on demand.

In some embodiments, data source services create and maintain a storage index for the data storage in which it may use to satisfy a data recovery request. Entries in the storage index are maintained for each data object that is to be presented. For example, if a virtual machine image is synthesized from file level backups, entries for the virtual machine image or segments within the virtual machine image may be created within the storage index.

The data source service may also determine the expense of transferring data its data source service. Such information may include the location (e.g. geographical position) of the source data, the format of the data, and the amount of data matching a hash.

A storage index is created for each data source service that may be used to satisfy a data recovery request. The storage index may be a set of entries, wherein each entry may include the length of the content, hash, locator (such as an identifier or address), a count (list size) and list of hashes of the files sharing the same content.

Data storage includes backup repositories, public cloud storage, networked storage, direct-attached storage, and internal storage systems.

By utilizing the enhanced techniques described herein, the efficiency of restore operations may be increased. For example, during a recovery operation, the recovery service may indicate that it only 100 segments of data to recover all the requested data. The data source service may then send only the 100 segments to the protected system. This may potentially realize large savings in bandwidth consumption. To illustrate, suppose the requested data is 1000 files. Many of the files may have many segments in common (e.g. two files have 90 segments in common). Instead of the backup repository sending 1000 files (which share many common segments) over the network, the backup repository only sends 100 segments.

Figure 2:
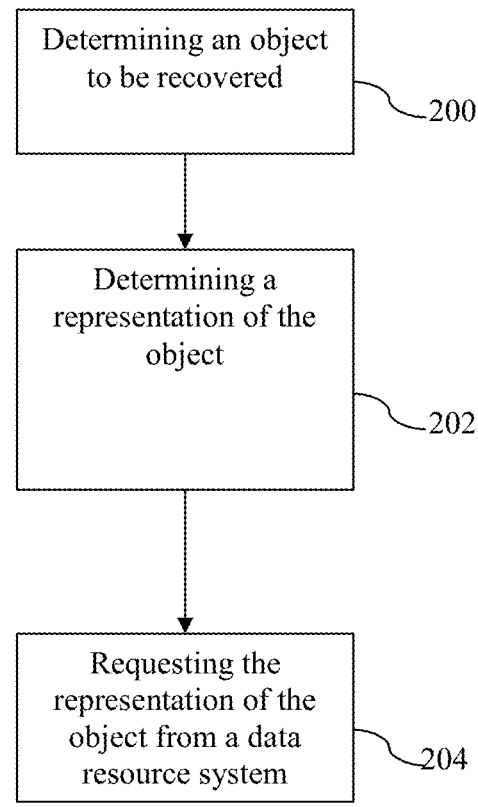
FIG. 2 is a flowchart of a method to backup data in accordance with some embodiments.

FIG. 2 illustrates a method to enhance recovery in accordance with some embodiments. In step 200, an object to be recovered is determined. In step 202, a representation of the object is determined. In some embodiments, the representation may be a hash value or may be a segment of the object. In step 204, the representation of the object is requested from a data resource system.

Figure 3:
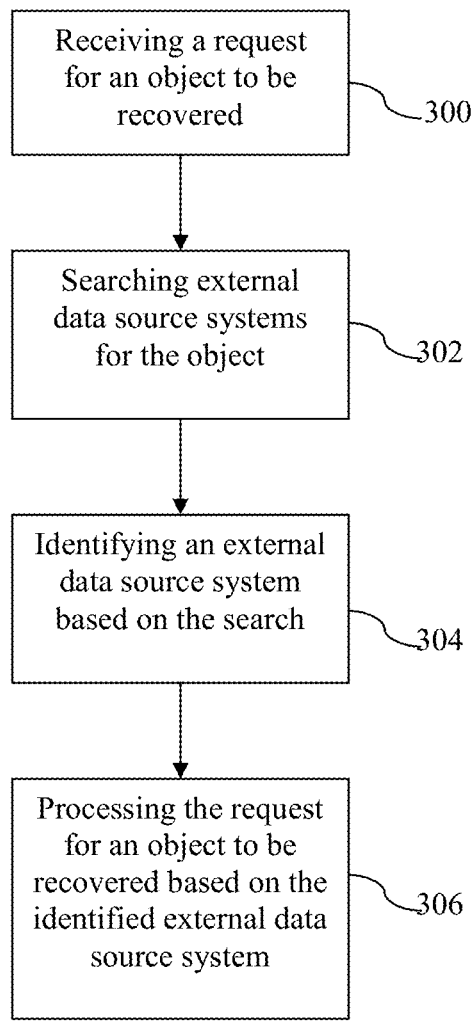
FIG. 3 is a flowchart of a method to recover data in accordance with some embodiments.

FIG. 3 illustrates a method to enhance recovery in accordance with some embodiments. In step 300, a request for an object to be recovered is received. In step 302, external data sources are searched for the object (e.g. data sources external to the data source that initially received the request for recovery). In step 304, an external data source system is identified based on the search. In step 306, the request for an object to be recovered is processed based on the identified external data system.

Figure 4:
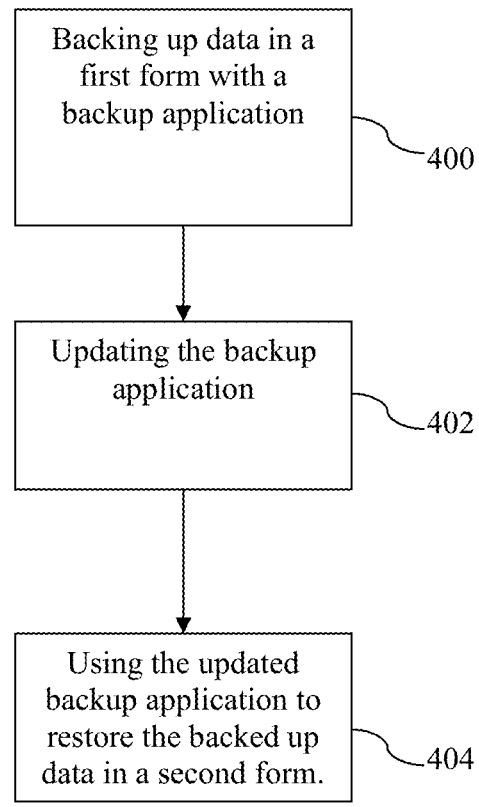
FIG. 4 is a flowchart of a method to access data in accordance with some embodiments.

FIG. 4 illustrates a method to recover data in accordance with some embodiments. In step 400, data is backed up in a first form with a backup application. In step 402, the backup application is updated. In step 404, the updated backup application is used to restore the backed up data in a second form. For example, the first form may be a copy of a Microsoft Exchange server, and the second form may be individual emails.

Figure 5:
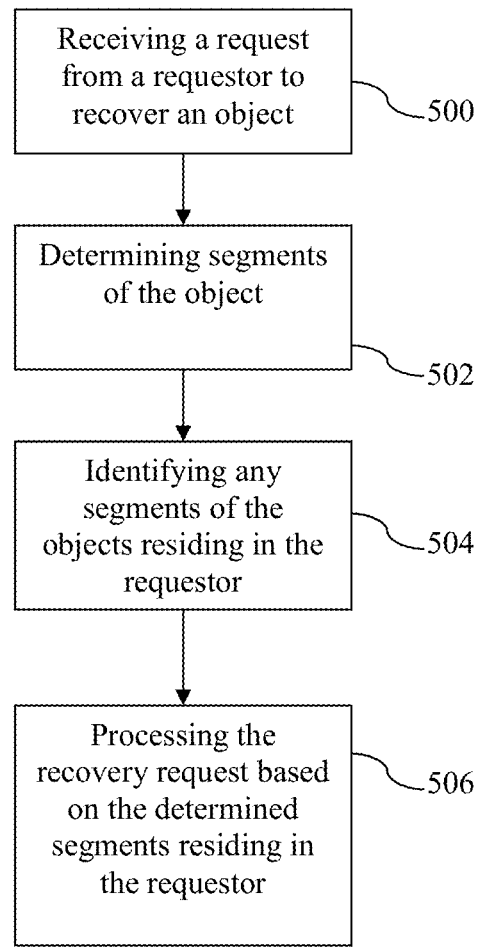
FIG. 5 is a flowchart of a method to preserve data in accordance with some embodiments.

FIG. 5 illustrates a method to recover data in accordance with some embodiments. In step 500, a request to recover an object is received from a requestor (e.g. a protected system). In step 502, segments of the object are determined. In step 504, segments of the objects residing in the requestor are identified. In step 506, the recovery request is processed based on the determined segments residing in the requestor.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for restoring data, comprising:
   backing up, using a back up service, data, wherein the data is stored on disk as one or more files and backing up the data includes creating a disk image of data stored as stored on disk, wherein the disk image form is a data format that is compatible with an operating system of a source system on which the data is initially stored, and the disk image form is one of Windows compatible or Linux compatible; and wherein the backing up of the data comprises:
      prior to the backing up of the data, authenticating an identity of the back up service to confirm that the back up service is authorized to back up the data;
   receiving a request to restore the backed up data in a requested form other than the disk image, wherein the requested form is a data format that is compatible with an operating system of a target system to which the data is restored, and the requested form is the other of Windows compatible or Linux compatible; and
   restoring the backed up data in the requested form at least in part by using a transformation service to transform the backed up data from the disk image form to the requested form.

2. The method as recited in claim 1, wherein the requested form comprises individual files.

3. The method as recited in claim 1, wherein the disk image form is Windows compatible.

4. The method as recited in claim 1, wherein the disk image form is Linux compatible.

5. The method as recited in claim 1, wherein:
   the restoring of the data is performed at least in part by a restoring service; and
   the restoring of the data comprises: prior to the restoring of the data, authenticating an identity of the restoring service to confirm that the restoring service is authorized to restore the data.

6. A system for restoring data, comprising a processor configured to:
   back up, using a back up service, data, wherein the data is stored on disk as one or more files and backing up the data includes creating a disk image of data stored as stored on disk, wherein the disk image form is a data format that is compatible with an operating system of a source system on which the data is initially stored, and the disk image form is one of Windows compatible or Linux compatible; and wherein the backing up of the data comprises to:
      prior to the backing up of the data, authenticate an identity of the back up service to confirm that the back up service is authorized to back up the data;
   receive a request to restore the backed up data in a requested form other than the disk image, wherein the requested form is a data format that is compatible with an operating system of a target system to which the data is restored, and the requested form is the other of Windows compatible or Linux compatible; and
   restore the backed up data in the requested form at least in part by using a transformation service to transform the backed up data from the disk image form to the requested form.

7. The system as recited in claim 6, wherein the requested form is individual files.

8. The system as recited in claim 6, wherein the disk image form is Windows compatible.

9. The system as recited in claim 6, wherein the disk image form is Linux compatible.

10. A computer program product for restoring data, comprising a non-transitory computer usable medium having machine readable code embodied therein for:
    backing up, using a back up service, data, wherein the data is stored on disk as one or more files and backing up the data includes creating a disk image of data stored as stored on disk, wherein the disk image form is a data format that is compatible with an operating system of a source system on which the data is initially stored, and the disk image form is one of Windows compatible or Linux compatible; and wherein the backing up of the data comprises:
       prior to the backing up of the data, authenticating an identity of the back up service to confirm that the back up service is authorized to back up the data;
    receiving a request to restore the backed up data in a requested form other than the disk image, wherein the requested form is a data format that is compatible with an operating system of a target system to which the data is restored, and the requested form is the other of Windows compatible or Linux compatible; and
    restoring the backed up data in the requested form at least in part by using a transformation service to transform the backed up data from the disk image form to the requested form.

11. The computer program product as recited in claim 10, wherein the requested form is individual files.

12. The computer program product as recited in claim 10, wherein the disk image form is Windows compatible.

13. The computer program product as recited in claim 10, wherein the requested disk image form is Linux compatible.

* * * * *